United States Patent Office 3,320,204
Patented May 16, 1967

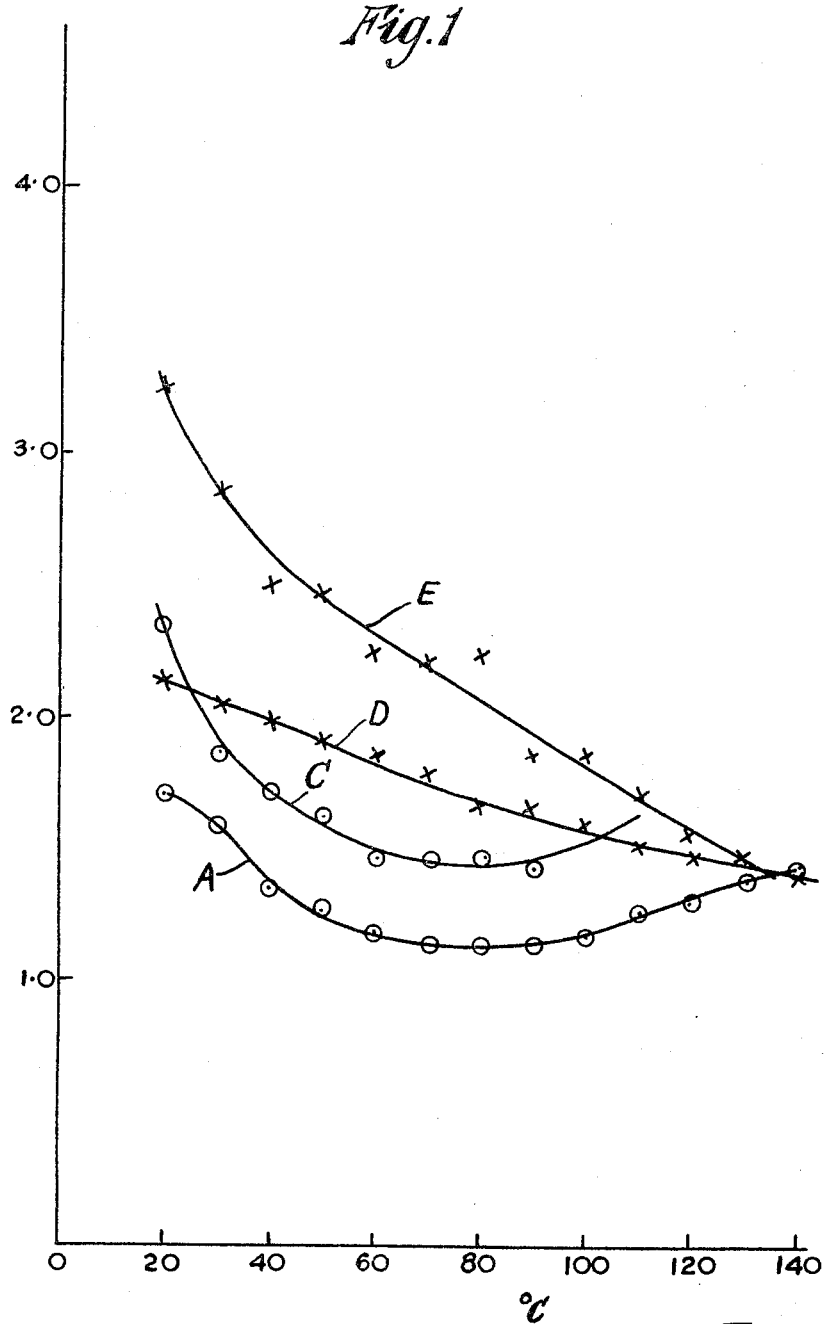

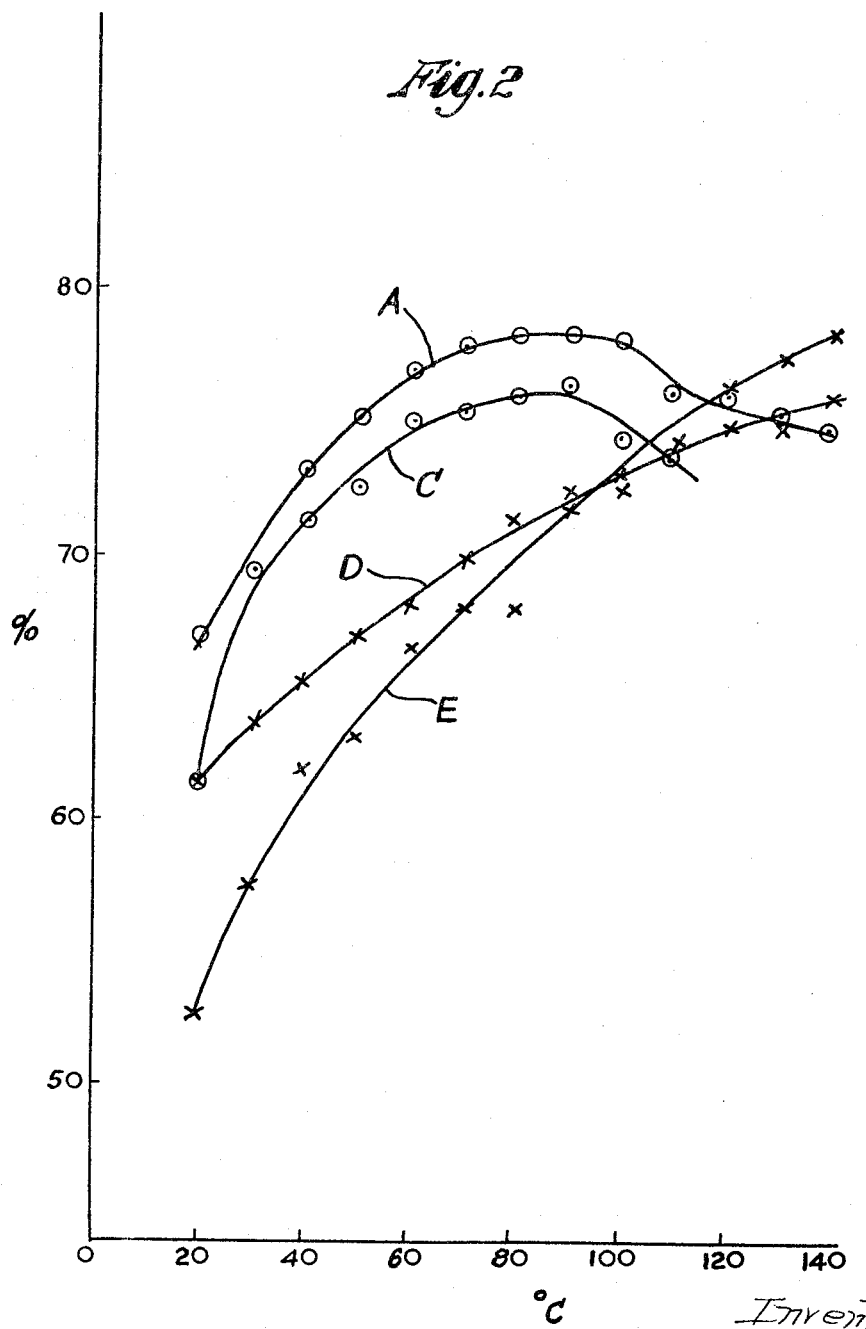

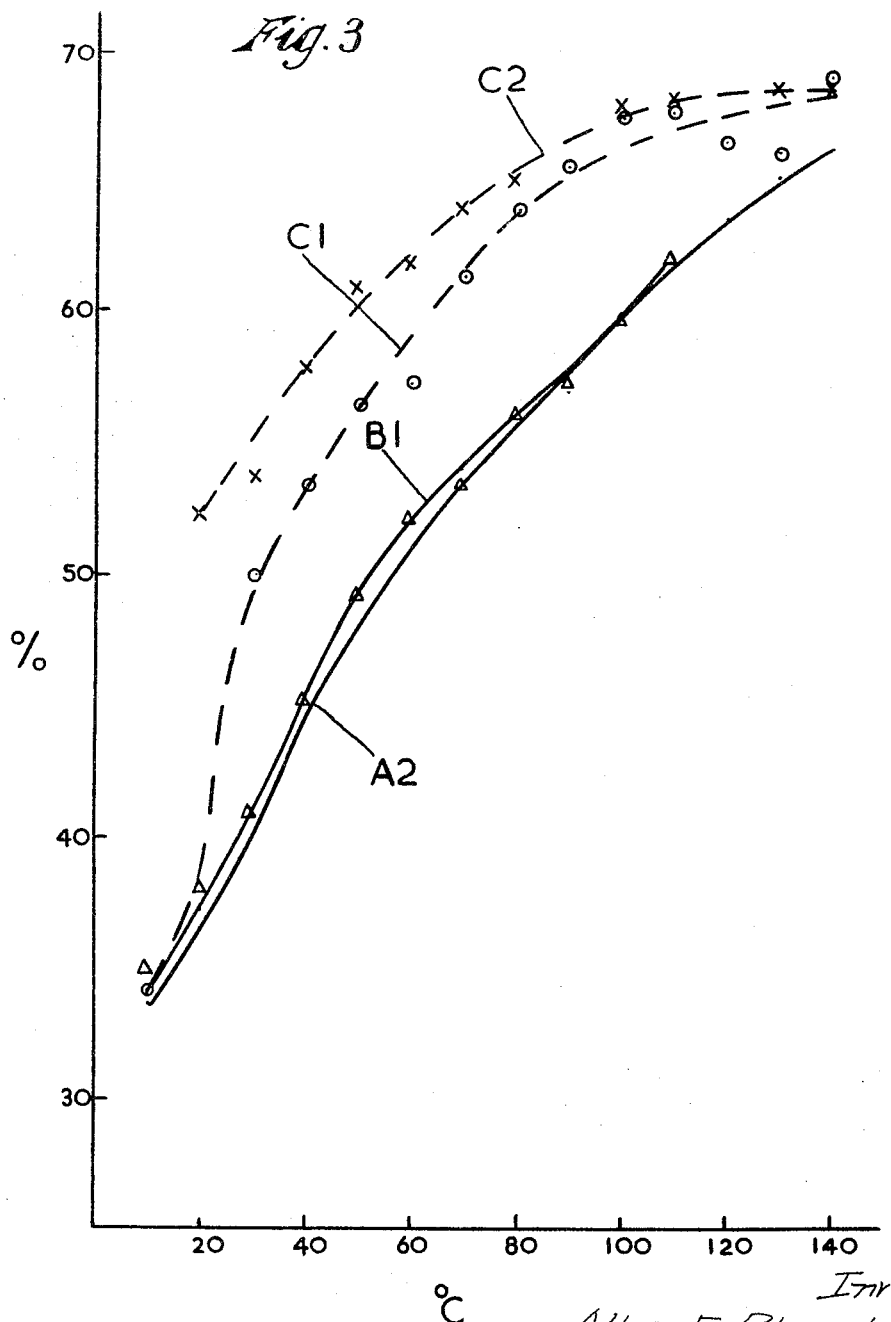

3,320,204
METHOD OF PREPARING A VULCANIZED
SYNTHETIC RUBBER
Allan Frederick Blanchard, Sutton Coldfield, and Michael
John Palmer, Cambridge, England, assignors to Dunlop
Rubber Company Limited, London, England, a British
company
Filed May 23, 1963, Ser. No. 282,761
Claims priority, application Great Britain, June 1, 1962,
21,144/62
13 Claims. (Cl. 260—33.6)

This invention relates to improved vulcanized elastomers prepared from precursors at least one of which has groups hydrolysable to carboxylic groups, for example copolymers of butadiene, styrene and an alkyl or aralkyl ester of an unsaturated carboxylic acid.

For many years the desirability of increasing the high temperature resilience of elastomers compounded with fillers whilst maintaining a desired degree of tear resistance has been recognized. Generally this basic problem of rubber technology has not been solved, for instance the inability to reduce the dynamic loss modulus $E''$, power loss and heat build up of styrene-butadiene rubbers by a significant margin has limited the application of this rubber and caused attention to be diverted to polybutadiene and cis-polyisoprene and the assumption has been made that polymer hysteresis properties are so dominated by the main composition of the polylmer chains that synthetic rubbers such as styrene-butadiene rubbers could not be modified and compounded so as to rival natural rubber.

Elastomer networks can be formed by reaction of polyvalent metal oxide or hydroxide with carboxylic acid groups in polymer chains, but hitherto it has been considered that their desirable features e.g. dimensional stability, would not coexist with those obtained by sulphur and peroxide systems of vulcanization. Moreover it has been found difficult to incorporate carboxylic acid groups and obtain polymers having maintained resistance to tearing and cut growth when compared in a reinforced and vulcanized condition with polymers containing no carboxylic acid groups; additionally in curing, a problem is presented by scorching, that is, premature vulcanization due to rapid reaction with the metal oxide or hydroxide.

We have found that vulcanized elastomers of improved properties, especially resilience, can be prepared from polymers, including copolymers of styrene and butadiene, by incorporating into them groups hydrolysable to carboxylic groups and by curing with, in addition to sulphur or peroxide as the primary curing agent, a polyvalent metallic oxide or hydroxide as supplementary curing agent to form additional cross-linkages in the presence of a neutral or basic organic hydroxy compound.

According to the present invention a method of preparing a vulcanized elastomer comprises heating a synthetic rubber polymer, having groups hydrolysable to carboxylic groups, with sulphur curatives or an organic peroxide and with an oxide or hydroxide of a polyvalent metal in the presence of a neutral or basic organic hydroxy compound.

The invention includes a vulcanized elastomer comprising a synthetic rubber polymer having sulphur or organic peroxide cross-linkages, containing a neutral or basic organic hydroxy compound and a polyvalent metal and having oxide cross-linkages.

The polyvalent metallic oxide or hydroxide, usually of calcium or lead, is usually added to the polymer in admixture with the neutral or basic organic hydroxy compound such as glycerol while the polymer is being worked in an internal mixer and the primary curatives may be added subsequently. The polyvalent metallic oxide or hydroxide must be sufficiently basic to hydrolyse the links of ester or other hydrolysable groups and thus zinc oxide, for instance, is not operative alone although after hydrolysis by a stronger base such as calcium hydroxide or plumbic oxide exchange between the zinc and the calcium or lead may occur.

Other non-acidic organic hydroxy compounds which may be employed include: ethylene glycol, diethylene glycol, 1,2 and 1,3 propylene glycols, 1,4 and 2,3 butylene glycols, 2,4 hexylene glycols, sucrose and starch. Usually not more than 2 percent by weight of the polymer is employed.

The synthetic rubber polymer having groups hydrolysable to carboxylic groups may be prepared by the copolymerization of monomers, for example butadiene and styrene, with a monomeric alkyl or aralkyl ester of a 1:2 unsaturated carboxylic acid for example an alkyl sorbate or acrylate such as methyl acrylate, methylmethacrylate or 2 cyanoethyl acrylate and itaconates. Mixtures of more than one ester may be used and maleates and fumarates may in the presence of styrene enter the polymer chain to a limited extent. The properties of the vulcanized elastomer may be varied by the use of different ester monomers in different amounts but usually in amounts not greater than 10, and usually from 5 to 10 percent by weight, and these should be chosen so that copolymerization yields a satisfactory copolymer capable of being vulcanized to yield an elastomer having desirable properties. Acrylonitrile, although it does not take part in the formation of the addition cross-linkages, yields desirable terpolymers with butadiene and an ester such an methylacrylate and the terepolymers may be crosslinked according to the invention.

The additional cross-linkages attributed to reaction of the hydrolysable groups with the neutral or basic organic hydroxy compound and the polyvalent metallic oxide or hydroxide result in improved resilience and permit the use of copolymers having a higher styrene content than has heretobefore been consistent with the production of elastomers of similar physical properties, from 35 percent up to about 60 percent by weight of the elastomer.

The amount of polyvalent metallic oxide or hydroxide available for cross-linking, that is, the amount in excess of normal compounding requirements e.g., for activation of a sulphur curing system, should not be excessive for instance not more than 40 percent calculated as calcium oxide based on the weight of methyl acrylate as the monomer having hydrolysable groups and is usually not less than 5 percent, in the presence of 3 percent of zinc oxide based on the weight of the combined polymers included in the sulphur curatives in order to activate the sulphur cure.

The elastomers may be reinforced with carbon black and extended by the addition of suitable oils of the type used for the oil extension of rubbers e.g. mineral oil fractions having a high paraffinic, naphthenic or aromatic content and having a viscosity gravity constant greater than 0.791, as defined in "Industrial and Engineering Chemistry," 20, 1928, p. 641. The amount of oil is generally less than 40 percent, and usually between 15 and 30 percent, by weight of the polymer. In the case where monomers are copolymerized the oil is usually added following copolymerization and prior to coagulation and may be added in an internal mixer. The copolymer may if desired, be blended with other polymers, and may be compounded with carbon black and processing aids such as stearic acid and mineral oil. The polyvalent metallic oxide or hydroxide and the neutral or basic organic hydroxy compound are added either in a final stage with the primary curatives or, preferably, while working the copolymer with carbon black in an internal mixer such as a Banbury mixer, the temperature being allowed to rise above 110° C. in the latter case. The carbon black may be added as a dispersion to a copolymer latex so as to form a latex-black master-batch.

The use of an internal mixer is of assistance in rapidly attaining a high shear in the copolymer, which assists in the dispersion of the carbon black and allows of the dispersion of low structure carbon blacks more readily than is usually the case and, since the viscosity can be augmented by the formation of salt cross-linkages due to the metallic oxide or hydroxide, the dispersion may be effectively accomplished by the preferred procedure in the presence of considerable amounts of oil. It is believed that the presence of the neutral or basic organic hydroxy compound and the polyvalent metallic oxide or hydroxide during the internal mixing leads to the formation of cross-linkages which persist during subsequent sulphur or peroxide curing.

After compounding in the internal mixer the primary curing additives are incorporated and antioxidants are often added at this stage. Usually a suitable amount of primary curing agent is of the same order as for similar polymers without hydrolysable groups, but both the amount of primary curatives and the time of cure may be decreased in order to obtain the maximum tear strength compatible with adequate resilience. Such adjustments are facilitated by the increased resilience due to supplementary oxide cross-linkages which do not impair tear resistance by imposing an excessive restriction of the polymer network at high strains.

Vulcanized elastomers having a BS hardness in the range of from 53 to 70 degrees, a resilience at 50° C. that is more than 95 percent of the resilience at 120° C. and a volume fraction $V_r$ of more than 0.12 when swollen to equilibrium in toluene at 21° C. may be prepared containing an amount of butadiene chemically combined in the polymer, in the range of from 70 to 98 percent by weight based on the polymer, and a reinforcing filler. Usually, and in preparing tyre treads preferably, the reinforcing filler is carbon black. Carbon black having an arithmetic mean particle diameter in the range of from 20 to 30 millimicrons, for example HAF black, may be added in the preparation of the above elastomer, in the range of from 40 to 60 percent based on the weight of the polymer together with processing and any extender oil included, yielding a vulcanized elastomer having a pendulum rebound resilience at 50° C. which is in excess of 66 percent, for example 68 to 70 percent, and which is more than 95 percent of the resilience at 120° C.

Vulcanized elastomers may be prepared containing chemically combined butadiene in the range of from 65 to 70 percent by weight of the polymer, at least 20 percent of chemically combined styrene by weight of the polymer and a reinforcing filler, and having a BS hardness in the range of from 53 to 73 degrees, a volume fraction $V_r$ of more than 0.12 when swollen to equilibrium in toluene at 21° C., and a resilience at 50° C. which is more than 90 percent of that at 120° C. Usually, and in preparing tyre treads preferably, the reinforcing filler is carbon black. Carbon black having an arithmetic mean particle diameter in the range of from 20 to 30 millimicrons, for example HAF black, may be added in the preparation of the above elastomer, in the range of from 40 to 60 percent based on the weight of the polymer together with processing and any extender oil included, yielding a vulcanized elastomer having a pendulum rebound resilience of more than 63 percent at 50° C. and which is more than 90 percent of the resilience at 120° C.

Vulcanized elastomers may also be prepared containing chemically combined butadiene in the range of from 60 to 65 percent by weight of the polymer, at least 25 percent of chemically combined styrene by weight of the polymer and a reinforcing filler, and having a BS hardness in the range of from 53 to 73 degrees, a volume fraction $V_r$ of greater than 0.12 when swollen to equilibrium in toluene at 21° C., and a resilience at 50° C. which is greater than 85 percent of that at 120° C. Usually, and in preparing tyre treads preferably, the reinforcing filler is carbon black. Carbon black having an arithmetic mean particle diameter in the range of from 10 to 20 millimicrons, for example SAF black, may be added in the preparation of the above elastomer, in the range of from 40 to 60 percent based on the weight of the polymer together with processing and any extender oil included, yielding a vulcanized elastomer having a pendulum rebound resilience of more than 50 percent at 50° C. and which is more than 85 percent of the resilience at 120° C.

Vulcanized elastomers may also be prepared containing chemically combined butadiene in the range of from 40 to 60 percent by weight of the polymer, at least 35 percent of chemically combined styrene by weight of the polymer and a reinforcing filler, and having a BS hardness in the range of from 53 to 73 degrees, a volume fraction $V_r$ of greater than 0.12 when swollen to equilibrium in toluene at 21° C., and a resilience at 50° C. which is greater than 80 percent of that at 120° C. Usually, and in preparing tyre treads preferably, the reinforcing filler is carbon black. Carbon black having an arithmetic mean particle diameter in the range of from 10 to 20 millimicrons, for example SAF black, may be added in the preparation of the above elastomer, in the range of from 40 to 60 percent based on the weight of the polymer together with processing and any extender oil included, yielding a vulcanized elastomer having a pendulum rebound resilience at 50° C. of more than 50 percent and which is more than 80 percent of the resilience at 120° C.

The invention is illustrated in the following examples in which the parts are by weight. The copolymers referred to were copolymerized from the monomers indicated, the ingredients marked with an asterisk were compounded on a Banbury internal mixer and the mix discharged when the temperature reached 160° C. The remaining ingredients were added on a cold mill.

The data referred to were obtained as follows:

Tensile strength, modulus at 300 percent and elongation at break were measured at 20 inches per minute and 21° C. The British Standard Hardness (degrees) was measured by the method described in the British Standards Booklet BS903, and expressed "BS Hardness °" in the following tables. Rebound resilience was measured by the pendulum test as described on page 830 of the Proceedings of the Rubber Technology Conference (1938). Tear resistance was measured according to the procedure described in BS903 and denoted by "ASTM" in the tables. Rate of cut growth was measured on the Gerke-Rainier apparatus or flexing through 70° at 300 c.p.m.—see Trans. Inst. Rubber Ind., 35, 45 (1959). Power loss and resilience data were obtained using the Bulgin-Hubbard machine as described in the Transactions of the Institution of the Rubber Industry 34, 201 (1958).

Power loss and resilience data were plotted against temperature in the accompanying graphs in which:

FIGURE 1 shows plots of power loss in joules/rev. with respect to temperature for the elastomers A, C, D and E of Example 5, containing 30 percent or less of chemically combined styrene based on the weight of the polymer.

FIGURE 2 shows calculated percentage resilience for the compounds of FIGURE 1 and FIGURE 3 shows calculated percentage resilience for the elastomers B and C of Example 1, B1 and C1, and the elastomers A and C of Example 2, A2 and C2, containing 40 percent or more of chemically combined styrene based on the weight of the polymer.

*Example 1*

| Copolymer: | Parts |
|---|---|
| Butadiene | 50 |
| Styrene | 40 |
| Methyl acrylate | 10 |
| Sinclair oil | 20 |

The Sinclair oil, a low viscosity naphthenic oil, was added prior to coagulation of the copolymer latex.

|                                         | A      | B      | C      |
|-----------------------------------------|--------|--------|--------|
| Copolymer, as above*                    | 100.00 | 100.00 | 100.00 |
| SAF black*                              | 50.00  | 50.00  | 50.00  |
| Process oil B, a low viscosity paraffinic mineral oil* | 7.00 | 7.00 | 7.00 |
| Stearic acid*                           | 1.00   | 1.00   | 1.00   |
| Glycerol*                               | 0.70   | 0.70   | 0.70   |
| Calcium oxide*                          | 2.50   |        | 2.50   |
| Zinc oxide                              |        | 3.00   | 3.00   |
| Antioxidants:                           |        |        |        |
|   Nonox HFN                   | 0.75   | 0.75   | 0.75   |
|   Santoflex AW                | 0.75   | 0.75   | 0.75   |
| Primary curing agents:                  |        |        |        |
|   Sulphur                     |        | 1.00   | 1.00   |
|   Santocure                   |        | 1.00   | 1.00   |

PROPERTIES AFTER CURING FOR 50 MINUTES AT 148° C.

|                                         | A      | B      | C      |
|-----------------------------------------|--------|--------|--------|
| Tensile strength (kg./cm.² at 21° C.)   | 51     | 132    | 144    |
| Modulus at 300% (kg./cm.² at 21° C.)    | 30     | 103    | 91     |
| Elongation at break (percent at 21° C.) | 529    | 356    | 454    |
| BS Hardness                             | 47     | 51.5   | 65     |
| Pendulum resilience percent at 50° C. (Dunlop test) | 42 | 46.5 | 54.5 |
| ASTM Tear strength at 21° C             | 10.1   | 9.5    | 15.3   |
| (Kg./test piece) at 100° C              | 2.2    | 3.6    | 6.7    |
| Volume fraction $V_r$ of rubber after swelling to equilibrium in toluene at 21° C | 0.076 | 0.142 | 0.130 |
| Density of insoluble crosslinks ($1/M_c \times 10^4$) (by equilibrium swelling in toluene) | 0.44 | 1.45 | 1.23 |

The antioxidant available as Nonox HFN is a mixture of 80 parts phenyl-beta-naphthylamine, 10 parts di-para-methoxy diphenylamine and 5 parts diphenyl-para-phenylenediamine: Santoflex AW is 6-ethexy-1:2-dihydro-2,2,4-trimethyl quinoline. The vulcanizing aid available as Santocure is N-cyclohexyl-2-benzthiazole sulphenamide.

*Example 2*

|                                         | A      | B      | C      | D      |
|-----------------------------------------|--------|--------|--------|--------|
| Copolymer:                              |        |        |        |        |
|   Butadiene                   | 50     | 50     | 50     | 50     |
|   Styrene                     | 50     | 50     | 40     | 40     |
|   Methyl acrylate             |        |        | 10     | 10     |
|   Sinclair oil                | 20     | 20     | 20     | 20     |
| Copolymer, as above*                    | 100.00 | 100.00 | 100.00 | 100.00 |
| SAF black*                              | 50.00  | 50.00  | 50.00  | 50.00  |
| Process oil B, a low viscosity paraffinic mineral oil* | 7.00 | 7.00 | 7.00 | 7.00 |
| Stearic acid*                           | 1.00   | 1.00   | 1.00   | 1.00   |
| Calcium oxide*                          |        | 2.50   | 2.50   | 2.50   |
| Glycerol*                               |        | 0.70   | 0.70   | 0.70   |
| Calcium oxide                           |        |        |        | 2.50   |
| Zinc oxide                              | 3.00   | 3.00   | 3.00   | 3.00   |
| Antioxidants:                           |        |        |        |        |
|   Nonox HFN                   | 0.75   | 0.75   | 0.75   | 0.75   |
|   Santoflex AW                | 0.75   | 0.75   | 0.75   | 0.75   |
| Primary curing agents:                  |        |        |        |        |
|   Sulphur                     | 1.00   | 1.00   | 1.00   | 1.00   |
|   Santocure                   | 1.00   | 1.00   | 1.00   | 1.00   |
|                                         | 164.50 | 167.70 | 167.70 | 170.20 |
| Plasticity and scorch time:             |        |        |        |        |
|   Mooney Plasticity           | 42.0   | 60.0   | 54.0   | 52.0   |
|   Time to scorch (minutes at 120° C.) | 134 | 82 | 60.5 | 39.5 |

PROPERTIES AFTER CURING FOR 50 MINUTES AT 148° C.

|                                         | A      | B      | C      | D      |
|-----------------------------------------|--------|--------|--------|--------|
| BS Hardness (°)                         | 59.5   | 69.0   | 55.5   | 54.0   |
| Pendulum resilience percent at 50° C. (Dunlop test) | 46.5 | 47.5 | 59.0 | 52.5 |
| ASTM tear strength at 100° C            | 12.9   | 13.5   | 11.6   | 6.8    |
| (Kg/t.p.) at 21° C                      | 16.2   | 18.0   | 20.1   | 20.2   |
| Tensile strength (kg./cm.²)             | 184    | 171    | 151    | 124    |
| Modulus at 300% elongation (kg./cm.²)   | 72     | 64     | 57     | 48     |
| Percent Elongation at break             | 540    | 569    | 593    | 596    |
| Cut growth (mm./hour) (Gerke-Rainier)   | 0.309  | 0.431  | 0.094  | 0.058  |
| Power loss at 20 kg. load at 20° C. (In joules/rev. by Bulgin/Hubbard machine) at 100° C | 4.17 | 3.62 | 3.08 | 3.40 |
|                                         | 3.37   | 3.27   | 2.17   | 2.59   |
| Power loss at constant deflection (joules/rev.): |   |    |        |        |
|   At 20° C                    |        |        | 3.50   | 4.85   |
|   At 100° C                   |        |        | 1.43   | 1.57   |
| Volume fraction $V_r$ of rubber after swelling to equilibrium in toluene at 20° C | 0.155 | 0.147 | 0.132 | 0.114 |
| Density of insoluble crosslinks ($1/M \times 10^4$) (by equilibrium swelling in toluene) | 1.01 | 0.87 | 1.26 | 0.97 |

The Sinclair oil was added to the copolymers prior to coagulation of the latices.

The improved resilience of the elastomers C of Examples 1 and 2 is shown by the curves C1 and C2 in FIGURE 3, compared with the similar elastomers, but not cross-linked according to the invention, B of Example 1 and A of Example 2 whose resilience is represented by curves B1 and A2.

*Example 3.—Optimum loading of calcium oxide*

Copolymer:
  Butadiene _____ 40
  Styrene _____ 50
  Methyl acrylate _____ 10
  Sinclair oil _____ 20

The Sinclair oil was added prior to coagulation of the copolymer latex.

*Example 3a*

Copolymer as above* _____ 100.00
SAF black* _____ 50.00
Mineral oil* _____ 7.00
Stearic acid* _____ 1.00
Glycerol* _____ 0.70
Calcium oxide, as shown below.
Zinc oxide _____ 3.00
Antioxidants:
  Nonox HFN _____ 0.75
  Santoflex AW _____ 0.75
Primary curing agents:
  Sulphur _____ 1.00
  Santocure _____ 1.00

| Properties | Cure mins. at 148° C. | Calcium oxide (percentage of methyl acrylate) | | | | |
|---|---|---|---|---|---|---|
| | | 0 | 15 | 25 | 30 | 35 |
| Tensile strength (kg./cm.² at 21° C.) | 50 | 168 | 159 | 147 | 153 | 144 |
| Modulus at 300% (kg./cm.² at 21° C.) | 50 | 102 | 128 | 123 | 104 | 106 |
| Elongation at break percent (at 21° C.) | 50 | 475 | 378 | 367 | 470 | 426 |
| BS hardness (°) | 50 | 78.0 | 86.5 | 87.5 | 87.5 | 87.0 |
| Pendulum resilience percent (by Dunlop test): | | | | | | |
|   At 21° C | 50 | 21.5 | 23.5 | 23.5 | 23.5 | 23.0 |
|   At 50° C | 50 | 25.5 | 29.5 | 30.0 | 25.5 | 26.0 |
|   At 75° C | 50 | 40.0 | 44.0 | 43.0 | 44.5 | 44.0 |
|   At 100° C | 50 | 54.5 | 59.5 | 60.6 | 61.0 | 60.5 |
| ASTM tear strength (kg./testpiece): | | | | | | |
|   At 21° C | 50 | 15.5 | 17.5 | 17.4 | 19.5 | 17.7 |
|   At 100° C | 20 | 8.9 | 11.6 | 11.1 | 13.6 | 13.7 |
| | 50 | 8.9 | 13.5 | 11.9 | 15.8 | 14.6 |
| Volume fraction $V_r$ of insoluble polymer when swollen to equilibrium in toluene | 50 | 0.157 | 0.168 | 0.164 | 0.151 | 0.149 |

*Example 4.—Comparison of addition of calcium oxide on a mill and in an internal mixer*

|  |  |  |
|---|---|---|
| Butadiene | 50 | 40 |
| Styrene | 40 | 50 |
| Methyl acrylate | 10 | 10 |
| Sinclair oil | 20 | 20 |

|  | A | B | C | D |
|---|---|---|---|---|
| Copolymer as above* | 100.00 | 100.00 | 100.00 | 100.00 |
| SAF black* | 50.00 | 50.00 | 50.00 | 50.00 |
| Mineral oil* | 7.00 | 7.00 | 7.00 | 7.00 |
| Stearic acid* | 1.00 | 1.00 | 1.00 | 1.00 |
| Glycerol* | 0.70 | 0.70 | 0.70 | 0.70 |
| Calcium oxide* |  | 2.50 |  | 2.50 |
| Calcium oxide | 4.50 | 2.00 | 2.50 |  |
| Antioxidants: |  |  |  |  |
|    Santoflex AW | 0.75 | 0.75 | 0.75 | 0.75 |
|    Nonox HFN | 0.75 | 0.75 | 0.75 | 0.75 |
| Primary curing agents: |  |  |  |  |
|    Santocure | 1.00 | 1.00 | 1.00 | 1.00 |
| Sulphur | 1.00 | 1.00 | 1.00 | 1.00 |
|  | 166.70 | 166.70 | 167.70 | 167.70 |

PROPERTIES AFTER CURING FOR 50 MINUTES AT 148° C.

|  | A | B | C | D |
|---|---|---|---|---|
| Tensile strength at 21° C. (kg./cm.²) | 116 | 114 | 147 | 155 |
| Modulus at 300% elong | 104 | 86 | 123 | 107 |
| Elongation at break percent (at 21° C.) | 326 | 371 | 367 | 452 |
| Pendulum resilience percent at 50° C. (Dunlop test) | 54.5 | 54.0 | 30.0 | 29.0 |
| BS Hardness (°) | 60.5 | 59.0 | 87.5 | 86.0 |
| ASTM tear strength (kg./testpiece): |  |  |  |  |
|    At 100° C | 4.7 | 5.7 | 11.9 | 13.7 |
|    At 21° C | 11.9 | 16.0 | 17.4 | 19.7 |
| Volume fraction $V_r$ of insoluble polymer when swollen to equilibrium in toluene | 0.147 | 0.141 | 0.164 | 0.154 |

The Sinclair oil was added to the copolymers prior to coagulation of the latices.

*Example 5*

Terpolymers of butadiene, styrene and methyl acrylate were prepared by free-radical emulsion copolymerization with the following monomer charge ratios, and a portion C of one batch was extended during mixing with oil.

|  | A | B | C |
|---|---|---|---|
| Butadiene | 60 | 70 | 70 |
| Styrene | 30 | 20 | 20 |
| Methyl acrylate | 10 | 10 | 10 |
| Aromatic extender oil available as Sundex 53 | 0 | 0 | 37.5 |

The following data were obtained from measurements on the raw terpolymers before any oil had been added:

|  | A | B | C |
|---|---|---|---|
| Mooney viscosity ML-4 at 100° C | 31 | 30 | 122 |
| Gel content (%) | 2 | Nil | 30 |
| Intrinsic viscosity | 2.40 | 1.78 | 0 |

Vulcanized compounds prepared from these terpolymers were then compared with styrene-butadiene control compounds based on polymers prepared at a low temperature (LTP) and oil-extended polymers (OEP), both having usual compositions, i.e.:

LTP (INTOL 1500)

Butadiene _____ 70
Styrene _____ 30
Oil _____ 0

|  | Ester Terpolymer Compounds ||| SBR Control Compounds ||
|---|---|---|---|---|---|
|  | A | B | or C | D | or E |
|  | *100 | 100 | ¹100 | *LTP 100 |  |
|  |  |  |  | *OEP | ¹100 |
| HAF black* | 50 | 50 |  | 50 |  |
| Mineral oil* | 5 | 5 |  | 5 |  |
| Stearic acid* | 1 | 1 |  | 1 |  |
| Calcium oxide* | 2.5 | 2 |  | — |  |
| Glycerol* | 0.7 | 0.7 |  | — |  |
| Zinc oxide | 3 | 3 |  | 3 |  |
| Antioxidants: |  |  |  |  |  |
|    Santoflex AW | 0.75 | 0.75 |  | 0.75 |  |
|    Nonox ZA | 0.75 | 0.75 |  | 0.75 |  |
| Primary curing agents: |  |  |  |  |  |
|    Sulphur | 1.75 | 1.75 |  | 1.75 |  |
|    Santocure | 1 | 1 |  | 1 |  |

¹ 27.3% oil.

OEP (INTOL 1712)

Butadiene _____ 70
Styrene _____ 30
Oil _____ 37.5

Vulcanized compounds of these copolymers were prepared to the following formulae:

These compounds were all cured for 50 minutes at 148° C. The physical properties of the compounds which were not oil-extended are compared below with the control LTP compound D. Compounds A and B, prepared according to the invention, have much higher resilience and yet their resistance to tearing and cut-growth is unimpaired.

|  | A | B | D |
|---|---|---|---|
| B.S. Hardness (°) | 65.5 | 67.0 | 63.5 |
| Resilience (percent) | 68.5 | 69.0 | 61.0 |
| (Dunlop pendulum) ASTM tear strength at 21° C |  | 15.9 | 16.3 |
| (Kg./testpiece) at 100° C | 7.8 | 11.7 | 7.9 |
| Cut-growth rate (mm./hr.) | 0.43 | 0.41 | 0.50 |
| (Rainier-Gerke) Tensile strength (kg./cm.²) | 208 | 177 | 248 |
| 300% modulus | 167 | 164 | 136 |
| Elongation at break (percent) | 362 | 317 | 482 |
| Volume fraction $V_r$ of rubber after swelling to equilibrium in toluene at 21° C | 0.200 | 0.186 | 0.210 |
| Mooney viscosity at 120° C | 68 | 49 | 51 |
| Time to scorch (mins.) | 26 | 37 | 81 |

Physical properties of the oil-extended terpolymer compound C are compared below with those for the OEP control compound E. The results again show that the method of the invention gives much higher resilience without impairing resistance to tearing or cut-growth.

|  | C | E |
|---|---|---|
| B.S. Hardness (°) | 59.5 | 58.0 |
| Resilience (percent) of 50° C | 69.0 | 61.0 |
| (Dunlop pendulum) ASTM tear strength at 21° C. (Kg./testpiece) at 100° C | 15.1 | 13.3 |
|  | 6.2 | 6.9 |
| Cut-growth rate (mm./hr.) | 0.57 | 0.69 |
| (Rainier-Gerke) tensile strength (kg./cm.²) | 122 | 176 |
| 300% Modulus | 111 | 124 |
| Elongation at break (percent) | 347 | 410 |
| Volume fraction $V_r$ of rubber after swelling to equilibrium in toluene at 21° C | 0.169 | 0.156 |
| Mooney viscosity at 120° C | 39 | 34 |
| Time to scorch (mins.) | 30 | 52 |

Between 20° C. and 100° C. the advantages of compounds A and C over the LTP and OEP compounds D and E are shown especially clearly by data on power loss and calculated resilience from the Bulgin-Hubbard machine in the graphs of FIGURES 1 and 2.

*Example 6.—Effect of metallo-carboxylate cross-links in a butadiene/methyl methacrylate copolymer*

Copolymer:
　Butadiene _____ 75
　Methyl methacrylate _____ 25

|  | A | B |
|---|---|---|
| Compound: |  |  |
| 　Copolymer * | 76.90 | 76.90 |
| 　Sinclair oil * | 23.10 | 23.10 |
| 　HAF black * | 50.00 | 50.00 |
| 　Mineral oil * | 5.00 | 5.00 |
| 　Stearic acid * | 1.00 | 1.00 |
| 　Calcium hydroxide * | | 2.50 |
| 　Glycerol * | | 0.70 |
| 　Zinc oxide | 3.00 | 3.00 |
| Antioxidants: |  |  |
| 　Santoflex AW | 0.75 | 0.75 |
| 　Nonox ZA | 0.75 | 0.75 |
| Primary curing agents: |  |  |
| 　Sulphur | 1.75 | 1.75 |
| 　Santocure | 1.00 | 1.00 |

PROPERTIES AFTER CURING FOR 50 MINUTES AT 148° C.

|  | A | B |
|---|---|---|
| Mooney plasticity at 120° C | 55 | 47 |
| Scorch (mins.) | 37 | 27 |
| Cure 15-30 at 50 lb.: |  |  |
| 　Tensile strength at 21° C. (kg./cm.²) | 152 | 124 |
| 　Modulus at 300% extension (kg./cm.²) | 127 | 121 |
| 　Elongation at break (percent) | 343 | 313 |
| 　Cut-growth rate (mm./hr.) | 0.909 | 0.766 |
| ASTM tear strength: |  |  |
| 　At 21° C. (kg./testpiece) | 9.9 | 10.6 |
| 　At 100° C | 5.4 | 5.8 |
| B.S. Hardness (°) at 21° C | 54.5 | 59.0 |
| Pendulum resilience at 50° C. (percent) | 62.5 | 71.0 |
| Volume fraction $V_r$ of rubber after swelling to equilibrium in toluene at 21° C | 0.170 | 0.166 |

In this example methyl methacrylate has been used instead of methyl acrylate. The above data show that in this case also the method of the invention imparts a much higher resilience without impairing resistance to tearing or cut-growth.

*Example 7.—Effect of different metallic oxides and hydroxides in equimolar proportion in a peroxide-cured butadiene/styrene/methyl acrylate copolymer*

PROPERTIES AFTER CURING FOR 50 MINUTES AT 148° C. AFTER 15 MINUTES RISE IN TEMPERATURE TO 148° C.

|  | CaO, 1.90 phr. | Ca(OH)₂, 2.50 phr. | ZnO 2.75 phr. |
|---|---|---|---|
| BS ° hardness at 21° C | 62.0 | 59.0 | 47.5 |
| Pendulum resilience, percent, 50° C | 47.5 | 49.0 | 32.0 |
| ASTM tear strength at 100° C. (kg./testpiece) | 3.0 | 3.0 | 2.3 |
| Tensile strength at 21° C. (kg./cm.²) | 105 | 103 | 76 |
| Modulus at 300% elong. (kg./cm.²) | 102 | 97 | 61 |
| Elongation at break, percent | 320 | 313 | 357 |
| Volume Fraction $V_r$ of rubber after swelling to equilibrium in toluene at 21° C | 0.148 | 0.138 | 0.137 |

|  | PbO, 7.55 phr. | MgO, 1.35 phr. | None |
|---|---|---|---|
| BS ° hardness at 21° C | 56.0 | 43.5 | 43.5 |
| Pendulum resilience, percent, 50° C | 41.0 | 32.5 | 31.0 |
| ASTM tear strength at 100° C. (kg./testpiece) | 2.8 | 2.1 | 2.4 |
| Tensile strength at 21° C. (kg./cm.²) | 99 | 79 | 73 |
| Modulus at 300% elong. (kg./cm.²) | 96 | 69 | 57 |
| Elongation at break, percent | 313 | 333 | 373 |
| Volume fraction $V_r$ of rubber after swelling to equilibrium in toluene at 21° C | 0.135 | 0.144 | 0.146 |

Copolymer:
　Butadiene _____ 40.00
　Styrene _____ 50.00
　Methyl acrylate _____ 10.00
　Sinclair oil (added to latex before coagulation) _____ 20.00
Compound:
　Polymer* _____ 100.00
　SAF black* _____ 50.00
　Stearic acid* _____ 1.00
　Mineral oil* _____ 7.00
Antioxidants:
　Santoflex AW* _____ 0.75
　Nonox ZA* _____ 0.75
Primary curing agent:
　Dicumyl peroxide _____ 2.00
　Glycerol _____ 0.70
　Metallic oxide or hydroxide, as above.

*Example 8*

Terpolymers were prepared with varying content of methyl acrylate and a constant proportion of butadiene to styrene (70:20). For the copolymerization the monomer charges were as follows:

|  | A | B | C |
|---|---|---|---|
| Copolymers: |  |  |  |
| 　Butadiene | 73.9 | 70 | 66.1 |
| 　Styrene | 21.1 | 20 | 18.9 |
| 　Methyl acrylate | 5.0 | 10 | 15 |
| Compounds: |  |  |  |
| 　Copolymer | 100.00 | 100.00 | 100.00 |
| 　HAF black | 50.00 | 50.00 | 50.00 |
| 　Mineral oil | 5.00 | 5.00 | 5.00 |
| 　Stearic acid | 1.00 | 1.00 | 1.00 |
| 　Zinc oxide | 3.00 | 3.00 | 3.00 |
| 　Calcium oxide | 2.00 | 2.00 | 2.00 |
| 　Glycerol | 0.70 | 0.70 | 0.70 |
| Antioxidants: |  |  |  |
| 　Santoflex AW | 0.75 | 0.75 | 0.75 |
| 　Nonox ZA | 0.75 | 0.75 | 0.75 |
| Primary curing agents: |  |  |  |
| 　Sulphur | 1.75 | 1.75 | 1.75 |
| 　Santocure | 1.00 | 1.00 | 1.00 |

The percentage content of methyl acrylate in the terpolymer was calculated by determining the percentage of oxygen by difference, and found to be 2.3, 10.4 and 17.9 respectively, thus indicating that the ester content of the terpolymer was approximately that of the initial charge.

PROPERTIES AFTER CURING FOR 50 MINUTES AT 148° C.

|  | A | B | C |
|---|---|---|---|
| Tripsometer resilience (percent) at 50° C | 63.5 | 63.0 | 59.5 |
| Power loss at 20 kg. load (Joules/rev.) at 50° C.: | 1.34 | 1.34 | 1.50 |
| 　Volume fraction $V_r$ of rubber after swelling to equilibrium in toluene at 21° C | 0.207 | 0.201 | 0.191 |

These results show that resilience, and power loss at constant load, are not adversely affected by reducing the charge of methyl acrylate to only 5 percent when copolymerizing this ester with butadiene/styrene in constant proportion (70/20) and compounding according to the method of the invention. In this case the CaO and glycerol were added with curatives on a rubber mill.

Example 9

Copolymer:
- Butadiene _____ 40
- Styrene _____ 50
- Methyl acrylate _____ 10
- Sinclair oil _____ 20

|  | A | B | C |
|---|---|---|---|
| Compounds: |  |  |  |
| Copolymer | 100.00 | 100.00 | 100.00 |
| SAF black | 50.00 | 50.00 | 50.00 |
| Stearic acid | 1.00 | 1.00 | 1.00 |
| Mineral oil | 7.00 | 7.00 | 7.00 |
| Primary curing agent: Dicumyl peroxide | 2.00 | 2.00 | 2.00 |
| Antioxidant: |  |  |  |
| Nonox ZA | 0.75 | 0.75 | 0.75 |
| Santoflex ZA | 0.75 | 0.75 | 0.75 |
| Calcium oxide | 1.90 | 1.90 | 1.90 |
| Glycerol | -------- | 0.70 | 1.40 |

PROPERTIES AFTER CURING FOR 50 MINUTES AT 148° C.

|  | | | |
|---|---|---|---|
| BS ° Hardness | 61.5 | 62.0 | 62.0 |
| Pendulum resilience, percent (at 50° C.) | 43.5 | 47.5 | 48.0 |
| Tensile strength (kg./cm.²) | 87 | 105 | 98 |
| Modulus at 300% elong. (kg./cm.²) | 84 | 102 | 103 |
| Elongation at break, percent | 310 | 320 | 297 |
| ASTM tear strength at 100° C. (kg./testpiece) | 2.6 | 3.0 | 3.1 |
| Volume fraction $V_r$ of rubber after swelling to equilibrium in toluene at 21° C | 0.155 | 0.148 | 0.147 |

Having now described our invention, what we claim is:

1. A method of preparing a vulcanizate of a synthetic rubber polymer having groups hydrolyzable to carboxylic groups prepared by polymerizing an ester of a 1,2-unsaturated carboxylic acid with butadiene, which comprises vulcanizing the rubber polymer in the presence of (a) a curing agent selected from the class consisting of sulfur curatives and organic peroxides, (b) lead monoxide or an oxide or hydroxide of calcium as supplementary curing agent, and (c) a non-acidic organic hydroxy compound.

2. A method according to claim 1 wherein the supplementary curing agent is an oxide or hydroxide of calcium.

3. A method according to claim 1 wherein the supplementary curing agent and the non-acidic organic hydroxy compound are mixed with the polymer while it is being worked in an internal mixer and the temperature of the polymer is allowed to rise above 110° C.

4. A method according to claim 3 wherein an amount of from 15 to 40 percent by weight of the polymer of a mineral oil having a viscosity gravity constant greater than 0.791 is worked with the polymer in the internal mixer.

5. A method according to claim 1 wherein the non-acidic organic hydroxy compound is a glycol.

6. A method according to claim 5 wherein the non-acidic organic hydroxy compound is a member of the class consisting of ethylene glycol, diethylene glycol, 1,2 and 1,3-propylene glycol, 1,4 and 2,3-butylene glycol and 2,4-hexylene glycol.

7. A method according to claim 1 wherein the non-acidic organic hydroxy compound is glycerol.

8. A method according to claim 1 wherein the ester of a 1,2-unsaturated carboxylic acid is methyl acrylate.

9. A method according to claim 1 wherein the ester of a 1,2-unsaturated carboxylic acid is methyl methacrylate.

10. A method according to claim 1, wherein the amount of the ester monomer is less than 10 percent by weight of the polymer.

11. A method according to claim 10 wherein the amount of the ester monomer is less than 5 percent by weight of the polymer.

12. A method according to claim 1 wherein the amount of the supplementary curing agent available for cross-linking is less than 40 percent calculated as calcium oxide based on the weight of methyl acrylate as the ester of a 1,2-unsaturated carboxylic acid.

13. A method according to claim 1 wherein the synthetic rubber polymer contains from 35 to 60 percent by weight of styrene.

References Cited by the Examiner

UNITED STATES PATENTS 2,710,292  6/1955  Brown _____ 260—83.3
2,849,426  8/1958  Miller _____ 260—79.5

FOREIGN PATENTS 857,379  12/1960  Great Britain.

OTHER REFERENCES

Kraus, G.: "Reinforcement of Elastomers," 1965, John Wiley & Sons (p. 442 relied on).

MORRIS LIEBMAN, *Primary Examiner.*

A. HOLTZ, J. FROME, *Assistant Examiners.*